Patented Sept. 26, 1944

2,359,276

UNITED STATES PATENT OFFICE 2,359,276

WATER-SOLUBLE DERIVATIVES OF HORMONELIKE ACTING PRODUCTS AND PROCESS OF MANUFACTURING THE SAME

Heinrich Medick, Wuppertal-Vohwinkel, Germany, assignor to Winthrop Chemical Company, Inc., New York, N. Y., a corporation of New York No Drawing. Application June 5, 1940, Serial No. 338,932. In Germany May 26, 1939

12 Claims. (Cl. 260—470)

This invention relates to water-soluble derivatives of hormone-like acting products and to a process of manufacturing the same.

It is known that hexane, $\Delta_3$-hexene and $\Delta_{2,4}$-hexadiene, the 3- and 4-carbon atoms of which each are substituted by a para-hydroxyphenyl radical have a sexualhormone-like effect. The said products are insoluble in water and their aqueous alkaline solutions are therapeutically not useful in view of their alkaline reaction.

In accordance with the present invention, the said hexane, $\Delta_3$-hexene and $\Delta_{2,4}$-hexadiene compounds, the 3- and 4-carbon atoms of which each are substituted by a para-hydroxyphenyl radical can be converted into products which are soluble in water with neutral reaction while maintaining their physiological activity by transforming them into the acid esters of sulfoarylcarboxylic acids, the salts of these acid esters respectively. The esterification is performed in the presence of tertiary organic bases such as pyridine, quinoline, dimethylaniline, phenyl - dimethyl - pyrazolone etc. with the mono-halides of the aromatic sulfo-carboxylic acids. The reaction is carried out for instance by dissolving the arylcarboxylic acid sulfohalide in anhydrous pyridine at elevated temperature and adding the 3,4-bis-(para-hydroxyphenyl)-hexane, -$\Delta_3$-hexene or -$\Delta_{2,4}$-hexadiene to this solution. By this reaction either both or only one hydroxyl group is esterified. In spite of using the sulfohalide compound probably the carboxyl group forms the ester group together with the phenolic hydroxyl group. One of the hydroxyl groups may be esterified also by another organic acid. As aryl sulfo-carboxylic acids, the mono-halides or -anhydrides of which are used in the process of the present invention, may be cited by way of example the sulfobenzoic acids, sulfosalicylic acid, sulfophthalic acid, diphenylcarboxylic acid-sulfonic acid, aliphatic sulfo-carboxylic acids and their substitution products.

The therapeutic activity of the products thus obtainable corresponds generally to the percentage of the therapeutically active starting material in the final product. In some cases, the efficacy of the starting materials seems still to be increased in the new products. The new compounds have proved to be sufficiently stable in an acid as well as in a neutral medium. The isotonic aqueous solutions can be used as non-irritant, highly active injection solutions. In solid form, for instance in the form of tablets, the new products are readily reabsorbed in the body.

The invention is furthermore illustrated by the following examples, without being restricted thereto:

*Example 1*

2.68 grams of 3,4-di-(para-hydroxyphenyl)-$\Delta_3$-hexene are introduced gradually at 80° C. into a solution of 4.7 grams of benzoic acid-3-sulfochloride in 10 grams of water-free pyridine. After heating for 2 hours to 80° C. on the water-bath, the solution is poured into ice water. By adding sodium chloride in solid form or in concentrated aqueous solution the sodium salt of the condensation product is precipitated in colorless, solid form. The compound is purified by repeated dissolving in water and renewed salting out, pressed off at last and dried. According to the analysis, the product is the disodium salt of the condensation product from 1 molecule of 3,4-di-(para-hydroxyphenyl)-$\Delta_3$-hexene and 2 molecules of benzoic acid-3-sulfochloride. The compound has in the mice-test a follicle-hormone-like effect at least equal to or even better than that of the equivalent quantity of the 3,4-di-(para-hydroxyphenyl)-$\Delta_3$-hexene used as starting product. The compound is readily soluble in cold water. Practically aqueous solution of every concentration desired for therapeutic use can be made.

*Example 2*

13.4 grams of 3,4-di-(para-hydroxyphenyl)-$\Delta_3$-hexene are dissolved in 60 ccms. of pyridine at 60° C. 23.5 grams of benzoic acid-3-sulfochloride are introduced into the solution so that the temperature does not exceed 80° C. The temperature is still maintained for 2 hours at 80° C. Then the warm reaction mass is poured into 1.3 liter of acetone. The precipitated pyridine salt of the 3,4-di-(para-hydroxyphenyl)-$\Delta_3$-hexene-bis - benzenesulfonic-acid-carboxylic acid-ester is sucked off, washed with acetone and freed from the solvent under reduced pressure.

It is converted into the sodium salt by dissolving 10 grams of the pyridine salt in 50 ccms. of warm water and heating to 80° C. for 15 minutes after the addition of 2.07 grams of anhydrous sodium acetate. By pouring the warm aqueous solution into 500 ccms. of acetone the pure ester-sodium salt is precipitated. It is sucked off, washed with acetone and dried under diminished pressure.

In an analogous manner the potassium, lithium, ammonium, dimethylamine, diethylaminoethanol and ethylenediamine salt can be obtained.

When reacting 3,4-di-(para-hydroxyphenyl)-hexane or -Δ2,4-hexadiene with benzoic acid-3-sulfochloride in the same manner, the acid sulfobenzoic acid esters of the said starting materials are obtained in the form of their corresponding salts.

I claim:

1. The process which comprises esterifying a compound selected from the group consisting of hexane, Δ3-hexene and Δ2,4-hexadiene compounds, the 3- and 4-carbon atoms of which each are substituted by a para-hydroxyphenyl radical, by means of a carboxylic acid sulfo-halide in the presence of a tertiary organic base.

2. The process which comprises esterifying a compound selected from the group consisting of hexane, Δ3-hexene and Δ2,4-hexadiene compounds, the 3- and 4-carbon atoms of which each are substituted by a para-hydroxyphenyl radical, by means of an aryl carboxylic acid sulfohalide in the presence of a tertiary organic base.

3. The process which comprises esterifying a compound selected from the group consisting of hexane, Δ3-hexene and Δ2,4-hexadiene compounds, the 3- and 4-carbon atoms of which each are substituted by a para-hydroxyphenyl radical, by means of a benzoic acid sulfohalide in the presence of a tertiary organic base.

4. The process which comprises esterifying a compound selected from the group consisting of hexane, Δ3-hexene and Δ2,4-hexadiene compounds, the 3- and 4-carbon atoms of which each are substituted by a para-hydroxyphenyl radical, by means of benzoic acid-3-sulfohalide in the presence of a tertiary organic base.

5. The process which comprises esterifying a Δ3-hexene compound the 3- and 4-carbon atoms of which each are substituted by a para-hydroxyphenyl radical, by means of an aryl carboxylic acid sulfohalide in the presence of a tertiary organic base.

6. The process which comprises esterifying a Δ3-hexene compound the 3- and 4-carbon atoms of which each are substituted by a para-hydroxyphenyl radical, by means of a benzoic acid sulfohalide in the presence of a tertiary organic base.

7. The process which comprises esterifying a Δ3-hexene compound the 3- and 4-carbon atoms of which each are substituted by a para-hydroxyphenyl radical, by means of benzoic acid-3-sulfohalide in the presence of a tertiary organic base.

8. The process which comprises esterifying a Δ3-hexene compound the 3- and 4-carbon atoms of which each are substituted by a para hydroxyphenyl radical, by means of an aryl carboxylic acid sulfohalide in the presence of pyridine.

9. The process which comprises esterifying a compound selected from the group consisting of hexane, Δ3-hexene and Δ2,4-hexadiene compounds, the 3- and 4-carbon atoms of which each are substituted by a para-hydroxyphenyl radical by means of a benzoic acid 3-sulfohalide in the presence of a tertiary organic base, and converting the product so produced into a water soluble alkali metal, ammonium or amine salt.

10. As a new compound an ester having the following probable general formula

wherein U represents hexane, Δ3 hexane and Δ2,4 hexadiene having the paraoxy phenyl groups united with the carbon atoms in the 3 and 4 positions, X represents a sulfocarboxylic ester group and alkali metal, ammonium and amine salts thereof, and $n$ represents an integer 1 and 2.

11. As a new compound an ester having the following probable general formula

wherein U represents hexane, Δ3 hexene and Δ2,4 hexadiene having the paraoxy phenyl groups united with the carbon atoms in the 3 and 4 positions, Y representing a sulfoaryl carboxylic ester group and alkali metal, ammonium and amine salts thereof, and $n$ represents an integer 1 and 2.

12. As a new compound an ester having the following probable general formula

wherein U represents hexane, Δ3 hexene and Δ2,4 hexadiene having the paraoxy phenyl groups united with the carbon atoms in the 3 and 4 positions, Z representing a sulfobenzoic ester group and alkali metal, ammonium and amine salts thereof, and $n$ represents an integer 1 and 2.

HEINRICH MEDICK.

CERTIFICATE OF CORRECTION.

Patent No. 2,359,276. September 26, 1944.

HEINRICH MEDICK.

It is hereby certified that error appears in the printed specification of the above numbered patent requiring correction as follows: Page 2, second column, line 23, claim 10, for "hexane" second occurrence, read --hexene--; and that the said Letters Patent should be read with this correction therein that the same may conform to the record of the case in the Patent Office.

Signed and sealed this 19th day of December, A. D. 1944.

Leslie Frazer

(Seal)                      Acting Commissioner of Patents.